US009665944B2

United States Patent
Harada

(10) Patent No.: US 9,665,944 B2
(45) Date of Patent: May 30, 2017

(54) IMAGE PROCESSING APPARATUS AND NON-TRANSITORY COMPUTER READABLE RECORDING MEDIUM STORING AN IMAGE PROCESSING PROGRAM WITH IMPROVED DUPLICATION OF CHARACTERS AGAINST A BACKGROUND IMAGE

(71) Applicant: KYOCERA Document Solutions Inc.

(72) Inventor: Hiroyuki Harada, Osaka (JP)

(73) Assignee: Kyocera Document Solutions, Inc. (JP)

( * ) Notice: Subject to any disclaimer, the term of this patent is extended or adjusted under 35 U.S.C. 154(b) by 3 days.

(21) Appl. No.: 14/803,338

(22) Filed: Jul. 20, 2015

(65) Prior Publication Data

US 2016/0034753 A1   Feb. 4, 2016

(30) Foreign Application Priority Data

Jul. 30, 2014   (JP) .................. 2014-155269

(51) Int. Cl.
| | | |
|---|---|---|
| *G06K 9/34* | (2006.01) | |
| *G06T 7/00* | (2017.01) | |
| *G06K 9/68* | (2006.01) | |
| *G06T 5/00* | (2006.01) | |
| *G06K 9/00* | (2006.01) | |

(52) U.S. Cl.
CPC ............ *G06T 7/0083* (2013.01); *G06K 9/344* (2013.01); *G06K 9/6828* (2013.01); *G06T 5/005* (2013.01); *G06K 2009/00489* (2013.01)

(58) Field of Classification Search
CPC ...... G06T 5/005; G06K 9/344; G06K 9/6828; G06K 2009/00489
See application file for complete search history.

(56) References Cited

U.S. PATENT DOCUMENTS

| | | | | |
|---|---|---|---|---|
| 2002/0015525 | A1* | 2/2002 | Fujiwara | G06K 9/38 382/182 |
| 2006/0204111 | A1* | 9/2006 | Koshi | G06F 17/289 382/229 |
| 2010/0114887 | A1* | 5/2010 | Conway | G06F 3/0237 707/737 |

FOREIGN PATENT DOCUMENTS

JP   2005-275863   10/2005

OTHER PUBLICATIONS

Bottou, U., Patrick Haffner, and Yann LeCun. "Efficient conversion of digital documents to multilayer raster formats." Document Analysis and Recognition, 2001. Proceedings. Sixth International Conference on. IEEE, 2001.*

* cited by examiner

*Primary Examiner* — Siamak Harandi
*Assistant Examiner* — Mai Tran

(57) ABSTRACT

In an image processing apparatus, a character recognizing unit identifies a character image in a document image. A font matching unit determines a character code and a font type corresponding to the identified character image. A fore-and-background setting unit sets the document image as a background image and sets a standard character image based on the determined character code and the determined font type. A background image correcting unit (a) deletes a deletion area in the background image, the deletion area taking a same position as the character image or the standard character image, (b) interpolates a differential area between the character image and the standard character image in a specific neighborhood area that contacts with the deletion area on the basis of the background image, and (c) interpolates the deletion area on the basis of the back ground image.

5 Claims, 10 Drawing Sheets

IMAGE PROCESSING APPARATUS AND NON-TRANSITORY COMPUTER READABLE RECORDING MEDIUM STORING AN IMAGE PROCESSING PROGRAM WITH IMPROVED DUPLICATION OF CHARACTERS AGAINST A BACKGROUND IMAGE

CROSS-REFERENCE TO RELATED APPLICATIONS

This application relates to and claims priority rights from Japanese Patent Application No. 2014-155269, filed on Jul. 30, 2014, the entire disclosures of which are hereby incorporated by reference herein.

BACKGROUND

1. Field of the Present Disclosure

The present disclosure relates to an image processing apparatus and a non-transitory computer readable recording medium storing an image processing program.

2. Description of the Related Art

A multi function peripheral extracts a character image in a document image as a raster image, determines a character code and a font type corresponding to the extracted character image, and replaces the character image in the document image with a character image based on the identified character code and the identified font type.

However, when replacing the character image as mentioned, the font shape of the character image is sometime not identical completely. In such cases, the difference between the shape of the original character image and the character image based on the character code and the font type leaves a part of the original character image around the character image after the replacement. Further, in such cases, if a background image includes an object (a pattern, a figure or the like) in the document image and the character image overlaps with the object in the background image, then the difference between the shape of the original character image and the character image based on the character code and the font type leaves a gap (i.e. a blank part) in the background image around the character image after the replacement.

As mentioned, replacing a character image in a document image with a character image based on a character code and a font type determined from the original character image sometimes drops the image quality of a neighborhood of the character image.

SUMMARY

An image processing apparatus according to an aspect of the present disclosure includes a character recognizing unit, a font matching unit, a fore-and-background setting unit, and a background image correcting unit. The character recognizing unit is configured to identify a character image in a document image. The font matching unit is configured to determine a character code and a font type corresponding to the identified character image. The fore-and-background setting unit is configured to set the document image as a background image and set a standard character image based on the determined character code and the determined font type. The background image correcting unit is configured to (a) delete a deletion area in the background image, the deletion area taking a same position as the character image or the standard character image, (b) interpolate a differential area between the character image and the standard character image in a specific neighborhood area that contacts with the deletion area on the basis of the background image, and (c) interpolate the deletion area on the basis of the background image.

A non-transitory computer readable recording medium according to an aspect of the present disclosure stores an image processing program. The image processing program causes a computer to act as a character recognizing unit, a font matching unit, a fore-and-background setting unit, and a background image correcting unit. The character recognizing unit is configured to identify a character image in a document image. The font matching unit is configured to determine a character code and a font type corresponding to the identified character image. The fore-and-background setting unit is configured to set the document image as a background image and set a standard character image based on the determined character code and the determined font type. The background image correcting unit is configured to (a) delete a deletion area in the background image, the deletion area taking a same position as the character image or the standard character image, (b) interpolate a differential area between the charter image and the standard character image in a specific neighborhood area that contacts with the deletion area on the basis of the background image, and (c) interpolate the deletion area on the basis of the back ground image.

These and other objects, features and advantages of the present disclosure will become more apparent upon reading of the following detailed description along with the accompanied drawings.

DETAILED DESCRIPTION

Hereinafter, embodiments according to aspects of the present disclose will be explained with reference to drawings.

Embodiment 1

Figure 1:
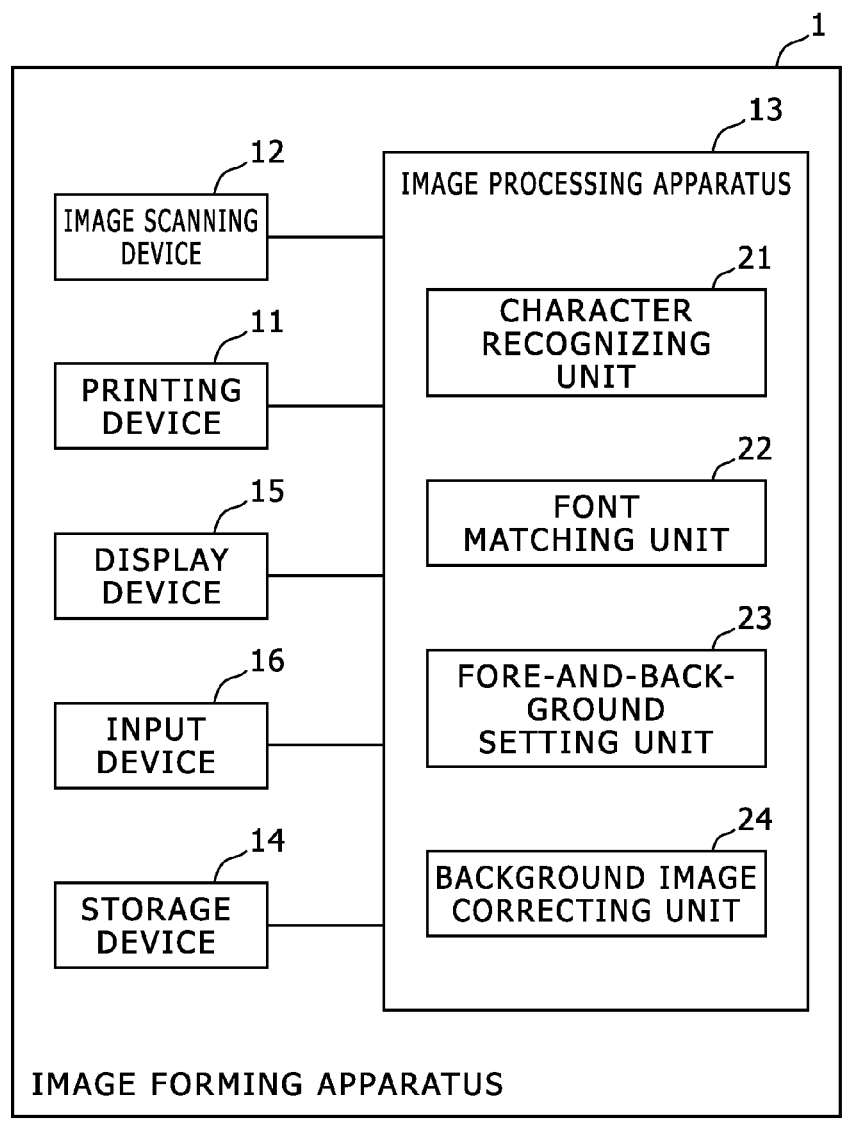
FIG. 1 shows a block diagram that indicates a configuration of an image forming apparatus that includes an image processing apparatus according to an embodiment of the present disclosure.

FIG. 1 shows a block diagram that indicates a configuration of an image forming apparatus that includes an image processing apparatus according to an embodiment of the present disclosure. The image forming apparatus 1 is a multi function peripheral, but may be a scanner, a copier or the like.

The image forming apparatus 1 includes a printing device 11, an image scanning device 12, an image processing apparatus 13, a storage device 14, a display device 15, and an input device 16.

The printing device 11 is an internal device that prints a document image based on image data after sorts of image processing by the image processing apparatus 13 in an electrophotographic process using toner of CMYK (Cyan, Magenta, Yellow, and Black) colors.

Further, the image scanning device 12 is an internal device that optically scans a document image of a document and generates image data of the document image as RGB data.

Furthermore, the image processing apparatus 13 performs image processing such as color adjustment, color conversion and so forth for image data such as the image data generated by the image scanning device 12.

Furthermore, the storage device 14 is a non volatile rewritable storage device such as a flash memory and stores sorts of data and programs.

The image processing apparatus 13 is embodied with an ASIC (Application Specific Integrated Circuit), a computer or the like, and includes a character recognizing unit 21, a font matching unit 22, a fore-and-background setting unit 23, and a background image correcting unit 24.

Figure 2:
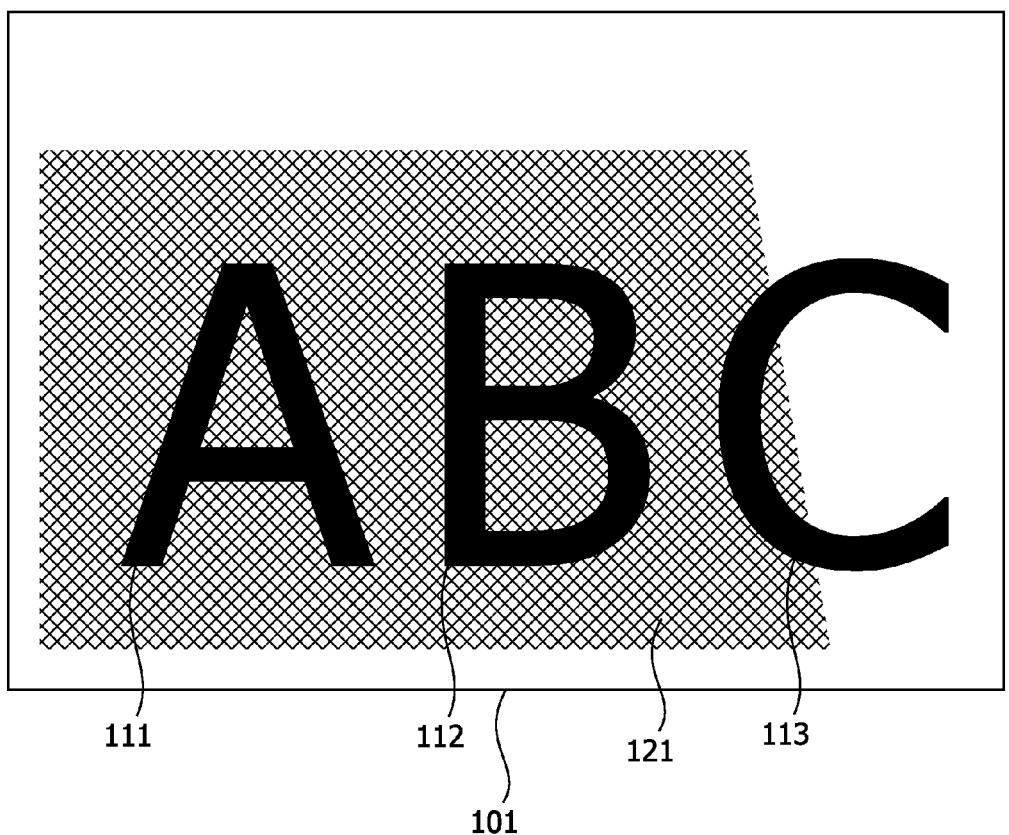
FIG. 2 shows a diagram that indicates an example of a document image.

FIG. 2 shows a diagram that indicates an example of a document image. A document image 101 shown in FIG. 2 includes character images 111 to 113 and an object 121 and the character images 111 to 113 overlap with the object 121. The object 121 shown in FIG. 2 is an image having a single and uniform color.

The character recognizing unit 21 identifies character images 111 to 113 in a document image 101 based on raster image data using an OCR (Optical Character Recognition) technique. In this process, the positions and the shapes of the character images 111 to 113 are identified.

Specifically, for example, the character recognizing unit 21 identifies a boundary (i.e. a contour) of the character image 111, 112 or 113 in the document image 101 by applying a labeling technique to a binary image of the document image 101.

The font matching unit 22 determines a character code and a font type corresponding to the identified character image 111, 112 or 113. Here, for example, on the basis of the shape of the identified character image 111, 112 or 113, the font matching unit 22 selects and determines the character code and the font type that indicate a character image having the nearest shape in dictionary data.

The fore-and-background setting unit 23 sets the document image 101 as a background image and sets a character image based on the determined character code and the determined font type (hereinafter, called "standard character image") as a foreground image.

The background image correcting unit 24 (a) deletes a deletion area in the background image where the deletion area has a same position as either (a1) the character image 111, 112 or 113 identified in the background image or (a2) the standard character image corresponding to the character image 111, 112 or 113, (b) interpolates a differential area between the character image 111, 112 or 113 and the standard character image in a specific neighborhood area (e.g. an area covering a range within the predetermined number of pixels from the boundary of the deletion area, an area inside of a boundary of a background object with which the deletion area overlaps, or the like) that contacts with the deletion area on the basis of the background image, and (c) interpolates the deletion area on the basis of the background image. Therefore, the deletion area is a white area or a blank area before the interpolation, and a pixel value of each pixel in the deletion area is determined on the basis of the neighborhood area of the deletion area, and the deletion area is filled with the pixel value so as to be a part of the background image.

For example, if the neighborhood area has a single color, then the deletion area is filled with the single color. If the neighborhood area has a non-uniform pattern such as a texture patter or a gradation patter, then the deletion area is filled with a pattern to keep the continuity of the pattern.

Figure 3:
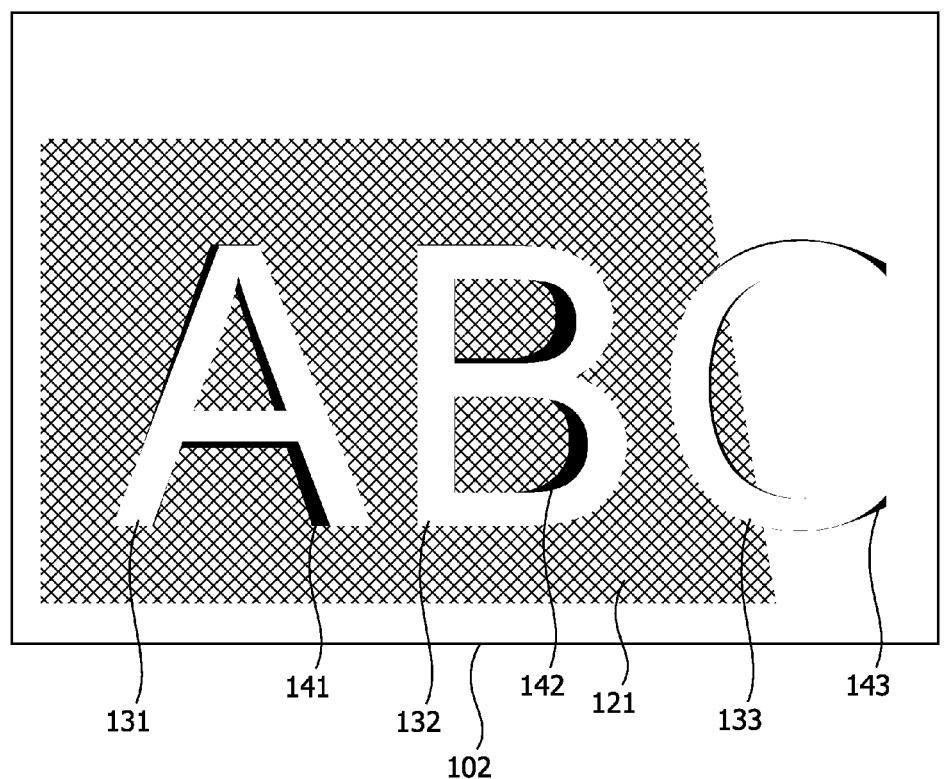
FIG. 3 shows a diagram that indicates an example of a differential area (i.e. a residue part) in Embodiment 1.
Figure 4:
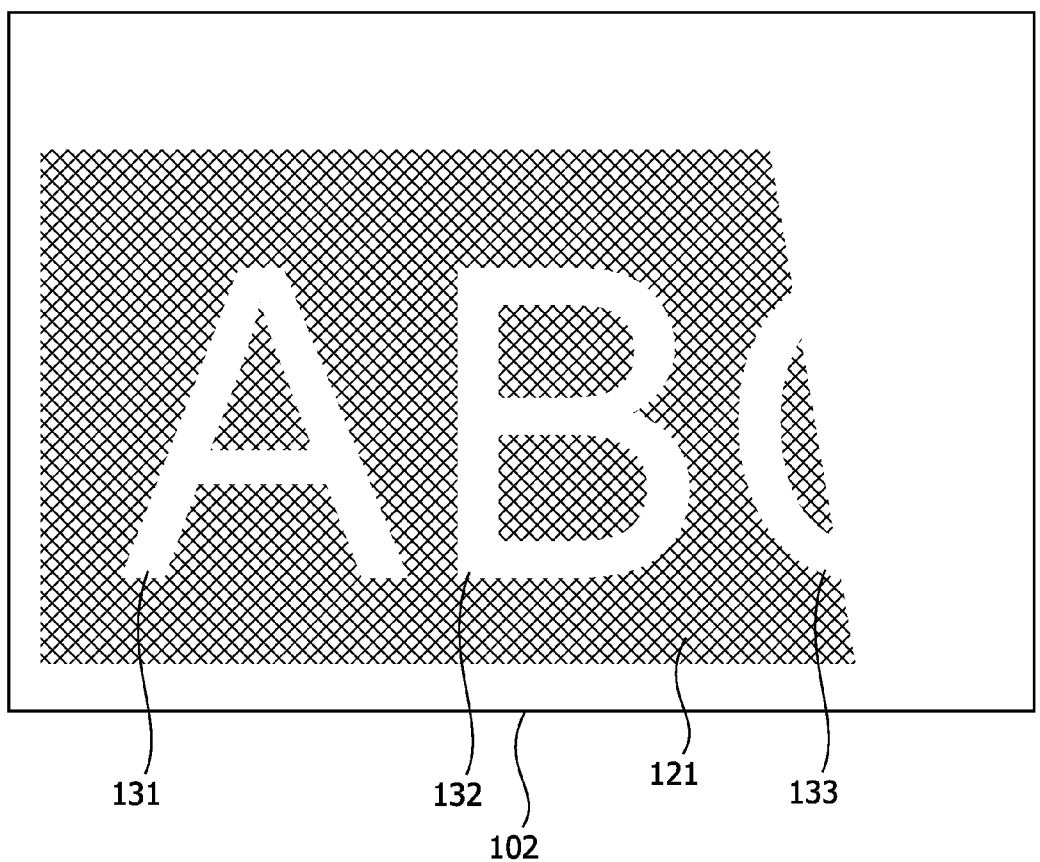
FIG. 4 shows a diagram that indicates an example of a deletion area in Embodiment 1.

FIG. 3 shows a diagram that indicates an example of a differential area (i.e. a residue part) in Embodiment 1. FIG. 4 shows a diagram that indicates an example of a deletion area in Embodiment 1.

In Embodiment 1, the background image correcting unit 24 (a) deletes the deletion area 131, 132 or 133 that is an area taking the same position as the standard character image corresponding to the character image 111, 112 or 113, (b) interpolates a residue part 141, 142 or 143 that is a differential part between the deletion area 131, 132 or 133 and the character image 111, 112 or 113 in a specific neighborhood area that contacts with the deletion area on the basis of the background image 102, and (c) interpolates the deletion area 131, 132 or 133 on the basis of the back ground image 102.

Further, (c1) if the deletion area is an open area that is partially surrounded with an object 121 included in the background image 102 and has a part not surrounded with an object 121 included in the background image 102 (e.g. the deletion area 133 in FIG. 4), then the background image correcting unit 24 (d1) determines intersection points between a boundary of the object 121 and a boundary of the deletion area 133 as endpoints, (d2) connects a pair of two of the endpoints with a straight line or a curved line and thereby changes a shape of the deletion area 133, and (d3) interpolates the deletion area 133 on the basis of the background image 102 after changing the shape of the deletion area 133. (c2) If the deletion area is a closed area that is completely surrounded with an object 121 included in the background image 102 (e.g. the deletion area 131 or 132 in FIG. 4), then the background image correcting unit 24 interpolates the deletion area 131 or 132 on the basis of the background image without changing the shape of the deletion area.

Specifically, the background image correcting unit 24 connects the pair of two endpoints with lines having shapes corresponding to respective boundaries (as straight lines or a curved line) of the object 121 that extend from the two endpoints.

Further, the background image correcting unit 24 identifies at least one of a gradation pattern and a texture pattern in a specific neighborhood area that contacts with the deletion area 131, 132 or 133, and interpolates the deletion area 131, 132 or 133 in accordance with the identified at least one of the gradation patter and the texture pattern. As a gradation pattern, its color changing direction, its color changing cycle length (i.e. the number of pixels in a width of one color), and its color changing amount (i.e. changing amount of a luminance value and color difference values) are identified. As a texture pattern, its pattern unit and its arrangement cycle length are identified.

It should be noted that for example, the foreground image and the background image 102 are compressed as respective independent layers, and one PDF (Portable Document Format) file is generated from compressed data of the layers. Otherwise, it may be applied that the foreground image and the background image 102 may be combined into one raster image data.

The following part explains a behavior of the image processing apparatus 13 in FIG. 1.

When image data of a document image 101 is provided to the image processing apparatus 13, the character recognizing unit 21 identifies a character image 111, 112 or 113 in the document image 101 using an OCR technique.

Subsequently, the font matching unit 22 determines a character code and a font type corresponding to the identified character image 111, 112 or 113.

The fore-and-background setting unit 23 sets the document image 101 as a background image and sets a standard character image based on the determined character code and the determined font type as a foreground image. It should be noted that the arrangement position and the size (one or both of the height and the width) of the standard character image are set as the same values as the original character image 111, 112 or 113.

At this timing, the background image 102 includes the character image 111, 112 or 113, and the differential area between the character image 111, 112 or 113 and the standard character image remains in the background image 102, and therefore, the background image correcting unit 24 corrects the background image 102 in the following manner.

Figure 5:
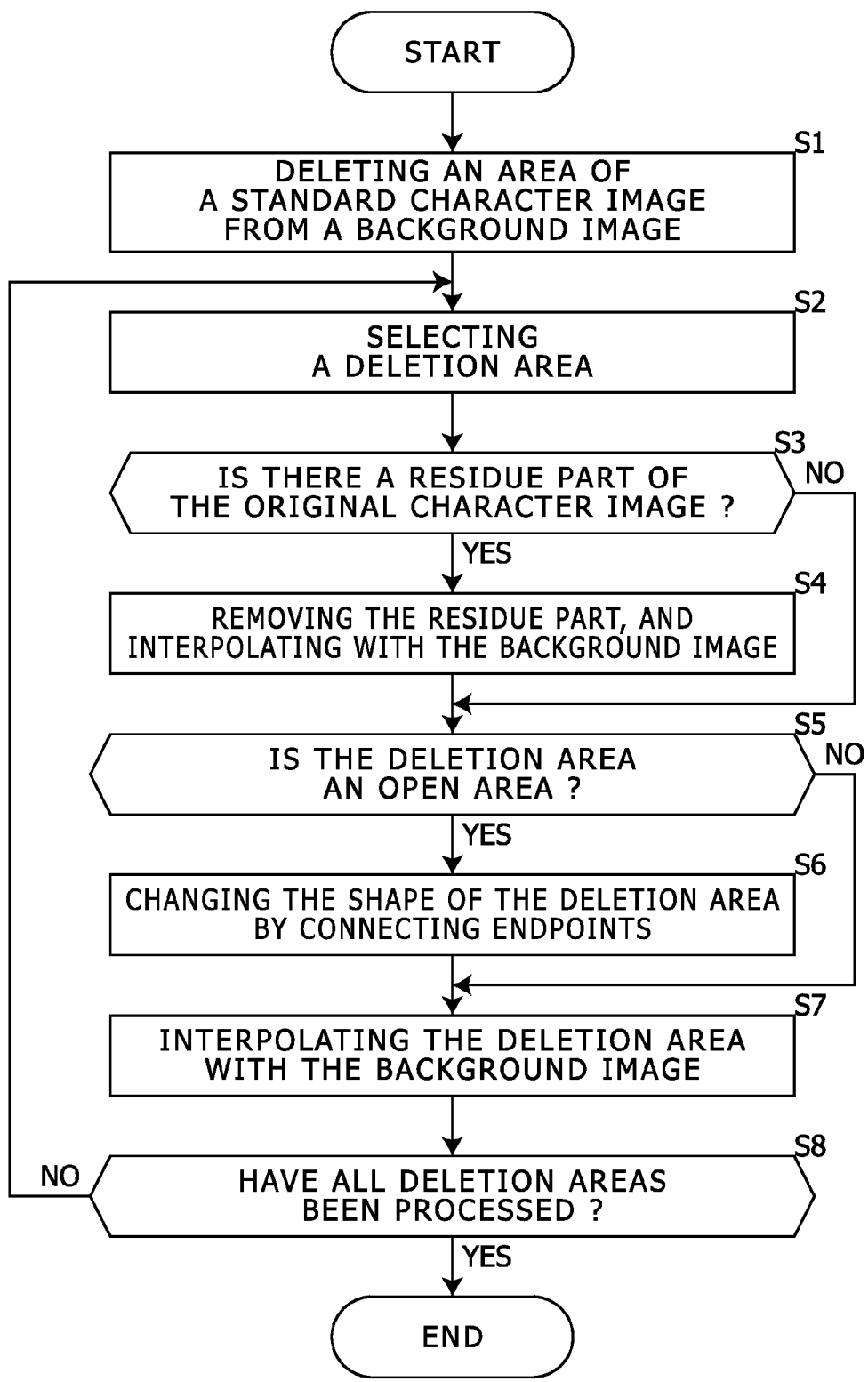
FIG. 5 shows a flowchart that explains a behavior of a background image correcting unit 24 in FIG. 1.

FIG. 5 shows a flowchart that explains a behavior of a background image correcting unit 24 in FIG. 1.

As shown in FIG. 3, for example, the background image correcting unit 24 deletes the deletion areas 131, 132 and 133 that are areas of the standard character images from the background image 102 (in Step S1).

Subsequently, the background image correcting unit 24 selects one of the deletion areas 131, 132 and 133 (in Step S2), and identifies whether at least one of residue parts 141, 142 and 143 of the original character images 111, 112 and 113 is in the neighborhood of the selected deletion area or not (in Step S3). If it is identified that at least one of the residue parts 141, 142 and 143 of the original character images 111, 112 and 113 is in the neighborhood of the selected deletion area, then the background image correcting unit 24 deletes the at least one of the residue parts 141, 142 and 143, and interpolates at least one area where the at least one of the residue parts 141, 142 and 143 is deleted, for example, as shown in FIG. 4, on the basis of the background image 102 (here, the object 121) (in Step S4).

Subsequently, the background image correcting unit 24 identifies whether the selected deletion area is an open area or not (in Step S5).

Figure 6:
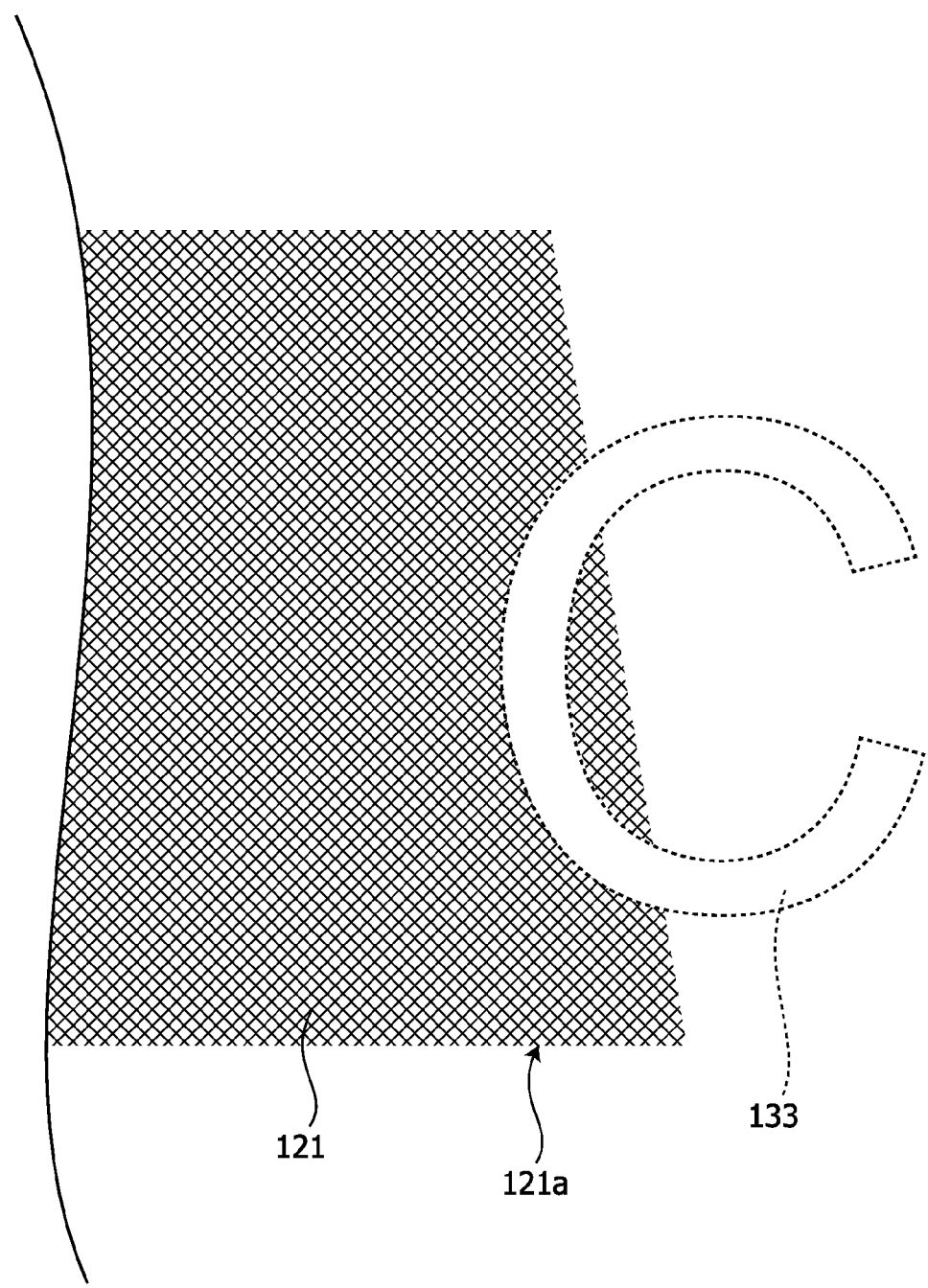
FIG. 6 shows a diagram that indicates an example of a deletion area as a closed area in Embodiment 1.
Figure 7:
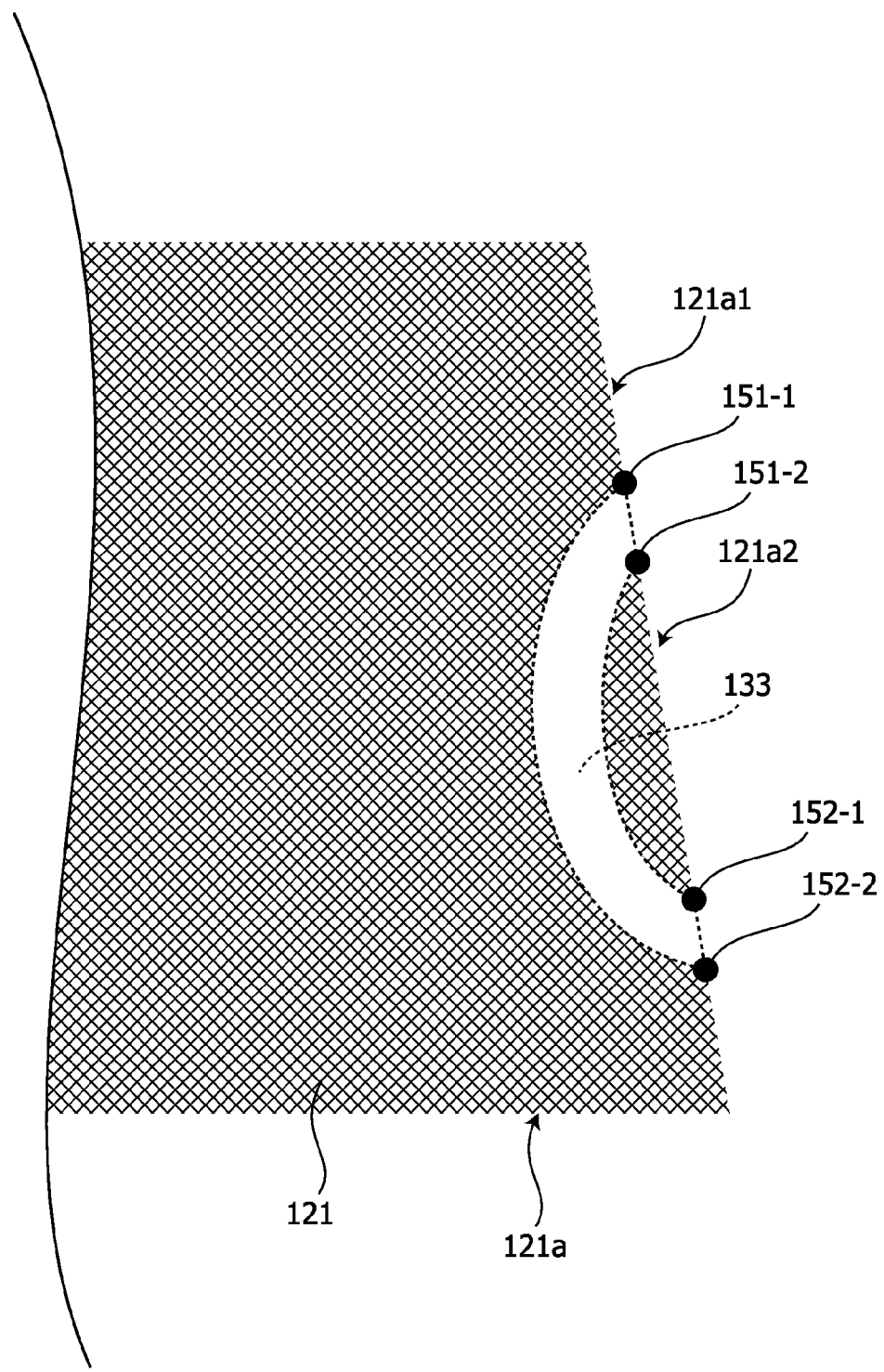
FIG. 7 shows a diagram that explains an example of changing a shape of a deletion area as an open area in Embodiment 1.

FIG. 6 shows a diagram that indicates an example of a deletion area as a closed area in Embodiment 1. FIG. 7 shows a diagram that explains an example of changing a shape of a deletion area as an open area in Embodiment 1.

For example, a boundary 121*a* (i.e. an edge) of the object 121 in the background image 102, and if the boundary 121*a* of the object 121 is cut off by a deletion area, it is identified that this deletion area is an open area, and otherwise, it is identified that this deletion area is a closed area (i.e. not an open area). Therefore, the deletion area 133 in FIG. 6 is identified as an open area.

Alternatively, for example, it may be applied that (a) it is identified whether a part near the boundary of the deletion area has no difference between a pixel value of the inside of the deletion area and a pixel value of the outside of the deletion area or not, and (b1) if a part near the boundary of the deletion area has no difference between a pixel value of the inside of the deletion area and a pixel value of the outside of the deletion area, then the deletion area is identified as an open area, and (b2) otherwise, it is identified that this deletion area is a closed area (i.e. not an open area).

If the selected deletion area is an open area, then the background image correcting unit 24 changes the shape of the selected deletion area (in Step S6). Firstly, as shown in FIG. 7, for example, the background image correcting unit identifies intersection points between the boundary of the object 121 and the boundary of the deletion area 133 as endpoints 151-1, 151-2, 152-1 and 152-2, and identifies pairs of two endpoints (151-1, 151-2) and (152-1 and 152-2). The number of the endpoints is always an even number, and for example, two endpoints that appear in turn along the boundary of the object 121 are identified as a pair, and thereby the pairs of the endpoints are identified. Subsequently, the background image correcting unit 24 connects each pair of the two endpoints with a straight line or a curved line and thereby changes the shape of the deletion area 133 as shown in FIG. 7, for example.

Here the background image correcting unit 24 connects the pair of two endpoints (151-1, 151-2), (152-1, 152-2) with lines having shapes corresponding to respective boundaries of the object 121 that extend from the two endpoints (151-1, 151-2), (152-1, 152-2).

For example, as shown in FIG. 7, the boundaries 121*a*1 and 121*a*2 that extend from the two endpoints 151-1, 151-2 are straight lines, and these straight lines locate on a single straight line, and therefore, the two endpoints 151-1, 151-2 are connected with a single straight line. In the same manner, the two endpoints 152-1, 152-2 are also connected with a single straight line.

Figure 8:
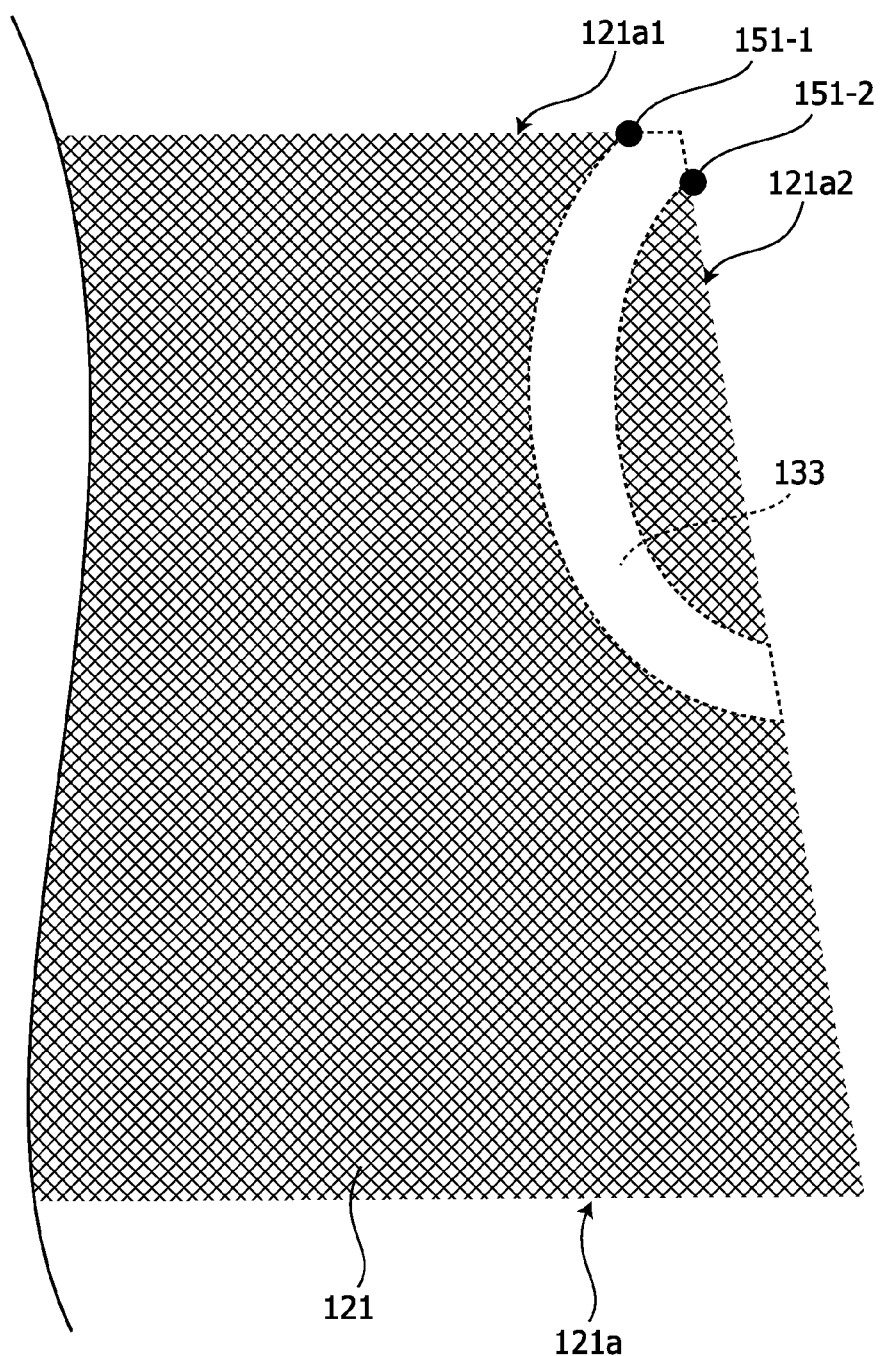
FIG. 8 shows a diagram that explains another example of changing a shape of a deletion area as an open area in Embodiment 1.
Figure 9:
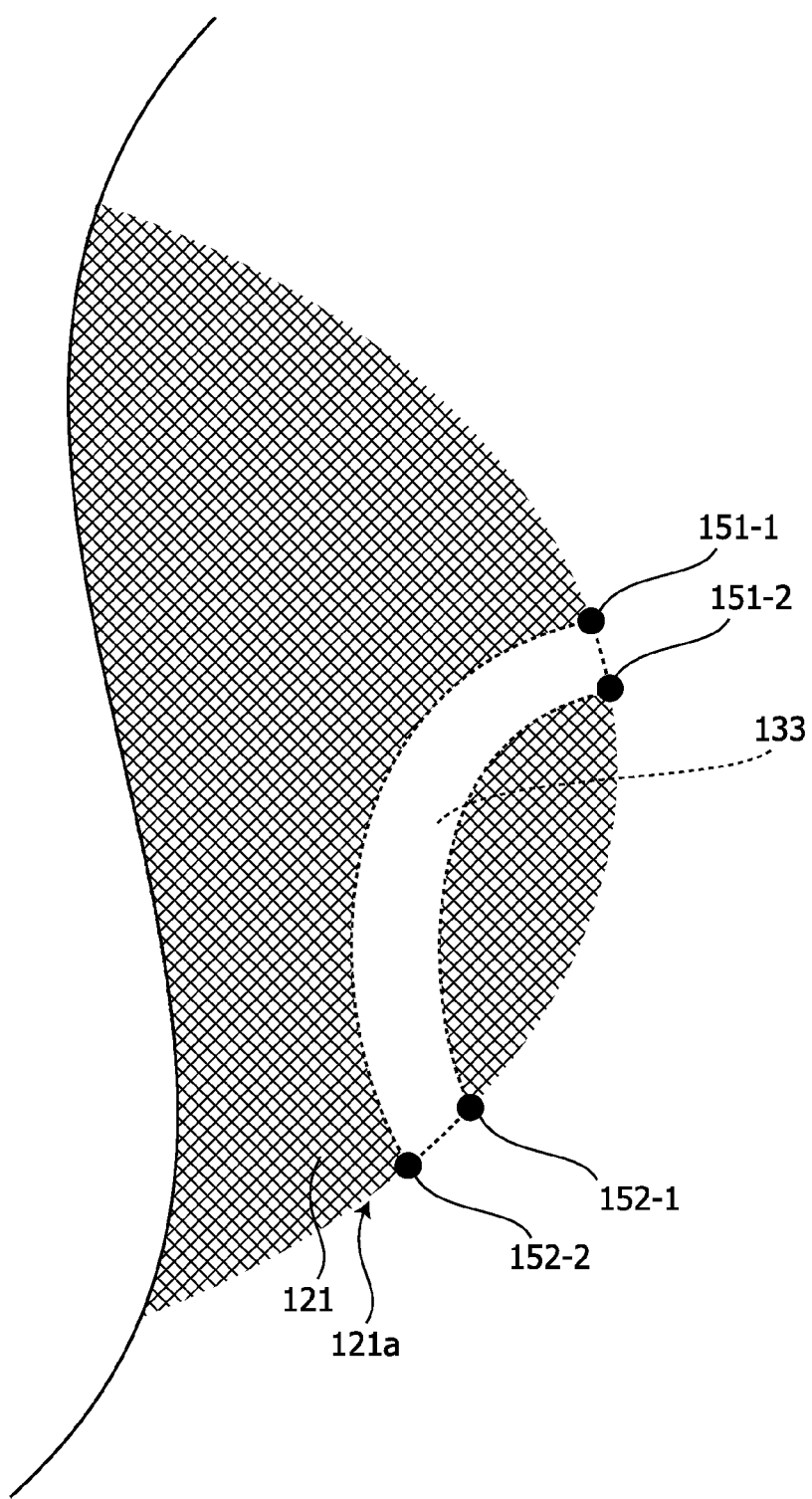
FIG. 9 shows a diagram that explains further another example of changing a shape of a deletion area as an open area in Embodiment 1.

FIG. 8 shows a diagram that explains another example of changing a shape of a deletion area as an open area in Embodiment 1. FIG. 9 shows a diagram that explains further another example of changing a shape of a deletion area as an open area in Embodiment 1.

For example, as shown in FIG. 8, the boundaries 121*a*1 and 121*a*2 that extend from the two endpoints 151-1, 151-2 are straight lines, but if these straight lines have respective slope angles different from each other, and therefore, the two endpoints 151-1, 151-2 are connected with two straight lines obtained by extrapolating the boundaries of the object 121 that respectively extend from the endpoints 151-1 and 151-2.

Further, for example, as shown in FIG. 9, if at least one of the boundaries of the object 121 that respectively extend from the endpoints 151-1 and 151-2 is a curved line, then the endpoints 151-1 and 151-2 are connected with a single curved line. In such a case, as the single curved line, a Bezier curve, a spline interpolation curve, or the like is used. In this case, in the same manner, the endpoints 152-1 and 152-2 are also connected with a single curved line.

Subsequently, the background image correcting unit 24 interpolates the deletion area 133 on the basis of the background image 102 (i.e. the object 121) (in Step S7). At this timing, the shape of the deletion area 133 has been changed.

It should be noted that if the selected deletion area is not an open area (i.e. a closed area), then the background image correcting unit 24 interpolates the selected deletion area on the basis of the background image 102 (i.e. the object 121) without changing the shape of the selected deletion area.

Figure 10:
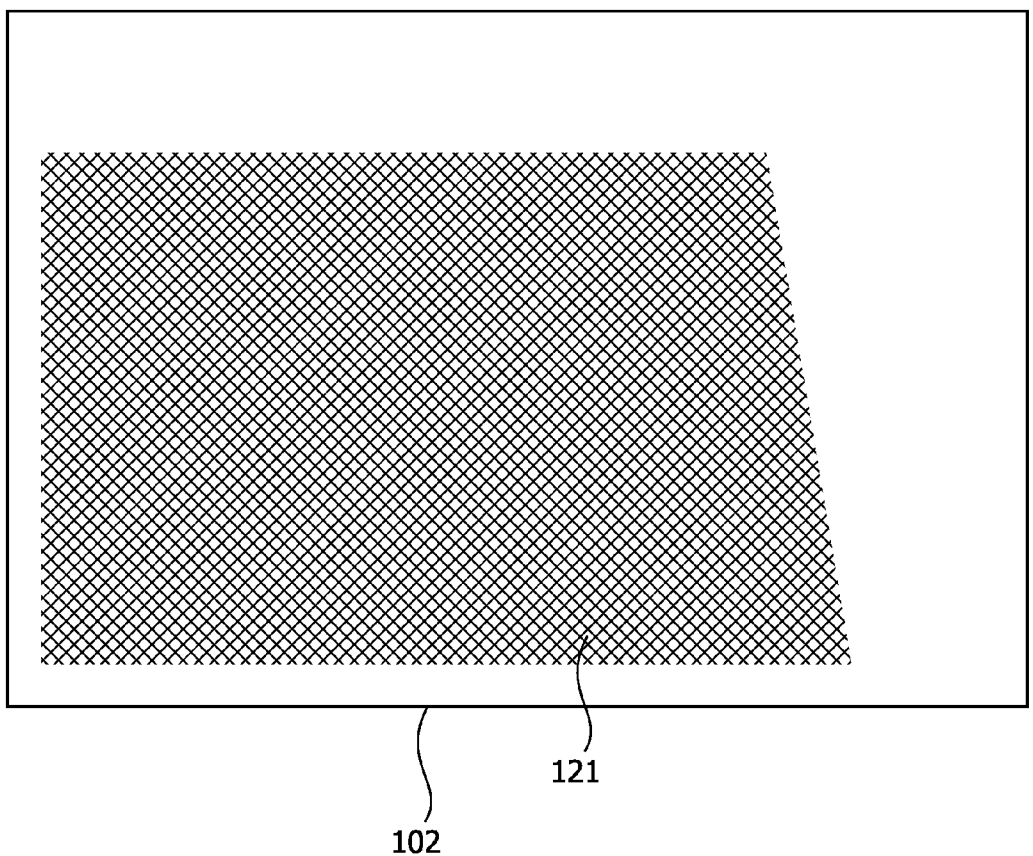
FIG. 10 shows a diagram that indicates an example of a processed background image 102 in Embodiment 1.

FIG. 10 shows a diagram that indicates an example of a processed background image 102 in Embodiment 1. As shown in FIG. 10, in the background image 102 that has been processed, the character image 111, 112 or 113 is deleted without leaving any differential areas, and the shape of the object 121 is properly restored.

As mentioned, in Embodiment 1, the character recognizing unit 21 identifies a character image 111, 112 or 113 in the document image 101; the font matching unit 22 determines a character code and a font type corresponding to the identified character image 111, 112 or 113; and the fore-and-background setting unit 23 sets the document image 101 as a background image and sets a standard character image based on the determined character code and the determined font type as a foreground image. The background image correcting unit 24 (a) deletes a deletion area 131, 132 or 133 in the background image 102 where the deletion area has a same position as either the character image 111, 112 or 113 or the standard character image (in Embodiment 1, the standard character image), (b) interpolates a differential area between the character image 111, 112 or 113 and the standard character image in a specific neighborhood area that contacts with the deletion area 131, 132 or 133 on the basis of the background image 102, and (c) interpolates the deletion area 131, 132 or 133 on the basis of the back ground image 102.

Consequently, it is restrained to drop the image quality in the neighborhood of the character image 111, 112 or 113 due to replacing the character image 111, 112 or 113 in the document image 101 with a character image based on a character code and a font type determined from this character image 111, 112 or 113.

Embodiment 2

An image processing apparatus in Embodiment 2 deletes the identified character image 111, 112 or 113 as a deletion area from the background image 102. Therefore, in Embodiment 2, the differential area between the character image 111, 112 or 113 and the standard character image is a blank area, and the blank area is interpolated on the basis of the background image 102 (here, the object 121).

It should be noted that other parts and behaviors of the image processing apparatus in Embodiment 2 is the same as that in Embodiment 1 and therefore it is not explained here.

Embodiment 3

In Embodiment 3, an image processing program is stored in a storage device in the aforementioned image forming apparatus, a terminal device or the like or a non-transitory computer readable recording medium. The image processing program causes a computer to act as functions of the image processing apparatus mentioned in Embodiment 1 or 2 (i.e. the functions of the character recognizing unit 21, the font matching unit 22, the fore-and background setting unit 23, and the background image correcting unit 24). The image processing program is read and executed by a computer built in the aforementioned image forming apparatus, a terminal device or the like.

Consequently, in the aforementioned image forming apparatus, a terminal device or the like, the character recognizing unit 21, the font matching unit 22, the fore-and background setting unit 23, and the background image correcting unit 24 are embodied.

The description has been presented for purposes of illustration and description, and is not intended to be exhaustive or limited.

For example, in Embodiment 1, 2 or 3, it may be applied that the background image correcting unit 24 (a) identifies a common object 121 to document images in plural pages (i.e. objects having the same shape, color and pattern in plural pages), (b) changes plural deletion areas in the common object 121 that correspond to the document images in the plural pages to a logical-sum area of the plural deletion areas, and (c) performs the aforementioned processes based on the logical-sum area as a deletion area.

Further, in Embodiment 1, 2 or 3, it may be applied that when filling the deletion area 131, 132 or 133 by the interpolation, the background image correcting unit 24 identifies whether a neighborhood area of the deletion area 131, 132 or 133 includes a texture pattern such as halftone dots or not using image data of a higher resolution (e.g. 600 dpi) than the resolution (e.g. 300 dpi) of the image data used in the character recognizing unit 21.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
   a character recognizing unit configured to identify a character image in a document image;
   a font matching unit configured to determine a character code and a font type corresponding to the identified character image;
   a fore-and-background setting unit configured to set the document image as a background image and set a standard character image based on the determined character code and the determined font type as a foreground image; and
   a background image correcting unit configured to (a) delete a deletion area in the background image, the deletion area taking a same position as the character image or the standard character image, (b) interpolate a differential area between the character image and the standard character image in a specific neighborhood area that contacts with the deletion area on the basis of the background image, and (c) interpolate the deletion area on the basis of the back ground image; wherein
   (c1) if the deletion area is an open area that is partially surrounded with an object included in the background image and has a part not surrounded with an object included in the background image, then the background image correcting unit determines intersection points between a boundary of the object and a boundary of the deletion area as endpoints, connects a pair of two of the endpoints with a straight line or a curved line and thereby changes a shape of the deletion area, and interpolates the deletion area on the basis of the background image after changing the shape of the deletion area; and
   (c2) if the deletion area is a closed area that is completely surrounded with an object included in the background image, then the background image correcting unit interpolates the deletion area on the basis of the background image.

2. The image processing apparatus according to claim 1, wherein the background image correcting unit connects the pair of two endpoints with lines having shapes corresponding to respective boundaries of the object that extend from the two endpoints.

3. The image processing apparatus according to claim 1, wherein the background image correcting unit identifies a common object to document images in plural pages, and changes plural deletion areas in the common object that correspond to the document images in the plural pages to a logical-sum area of the plural deletion areas.

4. The image processing apparatus according to claim 1, wherein the background image correcting unit identifies at least one of a gradation pattern and a texture pattern in a specific neighborhood area that contacts with the deletion area, and interpolates the deletion area in accordance with the identified at least one of the gradation pattern and the texture pattern.

5. A non-transitory computer readable recording medium storing an image processing program, the image processing program causing a computer to act as:
- a character recognizing unit configured to identify a character image in a document image;
- a font matching unit configured to determine a character code and a font type corresponding to the identified character image;
- a fore-and-background setting unit configure to set the document image as a background image and set a standard character image based on the determined character code and the determined font type; and
- a background image correcting unit configured to delete a deletion area in the background image, the deletion area taking a same position as the character image or the standard character image, (b) interpolate a differential area between the character image and the standard character image in a specific neighborhood area that contacts with the deletion area on the basis of the background image, and (c) interpolate the deletion area on the basis of the back ground image; wherein (c1) if the deletion area is an open area that is partially surrounded with an object included in the background image and has a part not surrounded with an object included in the background image, then the background image correcting unit determines intersection points between a boundary of the object and a boundary of the deletion area as endpoints, connects a pair of two of the endpoints with a straight line or a curved line and thereby changes a shape of the deletion area, and interpolates the deletion area on the basis of the background image after changing the shape of the deletion area; and (c2) if the deletion area is a closed area that is completely surrounded with an object included in the background image, then the background image correcting unit interpolates the deletion area on the basis of the background image.

* * * * *